US010644853B2

United States Patent
Xu et al.

(10) Patent No.: US 10,644,853 B2
(45) Date of Patent: May 5, 2020

(54) TRANSMISSION AND RECEPTION DEVICES PROCESSING COMPOSED PILOT SIGNALS

(71) Applicant: Huawei Technologies Duesseldorf GMBH, Duesseldorf (DE)

(72) Inventors: Wen Xu, Munich (DE); Mohamed Ibrahim, Munich (DE)

(73) Assignee: Huawei Technologies Dusseldorf GMBH, Dusseldorf (DE)

( * ) Notice: Subject to any disclaimer, the term of this patent is extended or adjusted under 35 U.S.C. 154(b) by 0 days.

(21) Appl. No.: 16/112,086

(22) Filed: Aug. 24, 2018

(65) Prior Publication Data

US 2019/0013914 A1    Jan. 10, 2019

Related U.S. Application Data

(63) Continuation of application No. PCT/EP2016/054060, filed on Feb. 26, 2016.

(51) Int. Cl.
*H04L 5/00* (2006.01)
*H04L 25/02* (2006.01)
*H04L 1/00* (2006.01)

(52) U.S. Cl.
CPC ............ *H04L 5/0048* (2013.01); *H04L 5/006* (2013.01); *H04L 5/0064* (2013.01); *H04L 5/0082* (2013.01); *H04L 5/0087* (2013.01); *H04L 25/024* (2013.01); *H04L 25/0222* (2013.01); *H04L 25/0226* (2013.01); *H04L 25/0256* (2013.01); *H04L 1/0026* (2013.01)

(58) Field of Classification Search
CPC ... H04L 5/0048; H04L 5/0082; H04L 5/0087; H04L 5/006; H04L 5/0064; H04L 25/024; H04L 25/0256; H04L 25/0222; H04L 25/0226; H04L 1/0026; H04L 27/2613
See application file for complete search history.

(56) References Cited

U.S. PATENT DOCUMENTS

| 2006/0146948 | A1 | 7/2006 | Park et al. | |
|---|---|---|---|---|
| 2009/0213950 | A1* | 8/2009 | Gorokhov | H04B 1/715 375/260 |
| 2011/0116516 | A1 | 5/2011 | Hwang et al. | |

(Continued)

FOREIGN PATENT DOCUMENTS

WO    2016069219 A1    5/2016

*Primary Examiner* — Joshua Kading
(74) *Attorney, Agent, or Firm* — Leydig, Voit & Mayer, Ltd.

(57) ABSTRACT

The disclosure relates to a transmission device for transmitting a radio signal over a radio channel. The transmission device includes: a radio signal generator, configured to generate a radio signal in time-frequency domain; a channel state information (CSI) interface, configured to receive CSI of the radio channel; a pilot generator, configured to compose a pilot signal from at least one pre-defined pilot signal, wherein a number and a location of the at least one pre-defined pilot signal in the composed pilot signal is determined based on at least one of a latency requirement and/or the received CSI; a pilot insertion unit, configured to insert the composed pilot signal into the radio signal; and a transmission unit configured to transmit the radio signal comprising the inserted composed pilot signal. The disclosure further relates to a reception device for receiving a radio signal over a radio channel.

17 Claims, 14 Drawing Sheets

(56) References Cited

U.S. PATENT DOCUMENTS

| | | | |
|---|---|---|---|
| 2014/0362805 A1 | 12/2014 | Nyström et al. | |
| 2016/0127093 A1* | 5/2016 | Jiang | H04L 5/0051 370/330 |
| 2016/0359600 A1* | 12/2016 | Krzymien | H04L 5/0048 |
| 2017/0041763 A1* | 2/2017 | Jalali | G01S 5/14 |

* cited by examiner

TRANSMISSION AND RECEPTION DEVICES PROCESSING COMPOSED PILOT SIGNALS

CROSS-REFERENCE TO RELATED APPLICATIONS

This application is a continuation of International Application No. PCT/EP2016/054060, filed on Feb. 26, 2016, the disclosure of which is hereby incorporated by reference in its entirety.

TECHNICAL FIELD

The present disclosure relates to transmission and reception devices processing composed pilot signals. In particular, the present disclosure relates to techniques of incremental pilot allocation.

BACKGROUND

In mobile communications systems, the receiver obtains a distorted version of the transmit signal due to channel impairments such as multipath echoes and Doppler effects. The receiver needs to compensate the distortions of the channels by processing the received signal according to the knowledge of the channel distortions. In order to obtain the knowledge of the channel, the transmitter transmits training symbols—called pilots—which are known to the receiver. The receiver uses the channel knowledge at the pilots and extends this knowledge to other data symbols, to compensate the effect of the channel.

In current mobile communication systems such as LTE (Long Term Evolution), pilots are inserted at fixed time/frequency spacing (fixed density). Those spacing are chosen according to the worst expected channel fading in time and frequency. Fixed pilot spacing is only optimal when the channel is exactly at the worst expected channel. If for any reason, the channel is worse than the worst expected channel, then the reliability of the link is degraded. If the channel is better than the worst expected (which is the most common case), then the pilots act as an undesired overhead which could have been used for data transmission to boost the throughput instead.

SUMMARY

It is the object of the application to provide a concept for increasing data throughput without decreasing reliability in mobile communication systems such as LTE.

This object is achieved by the features of the independent claims. Further implementation forms are apparent from the dependent claims, the description and the figures.

A basic idea of the application is to apply a novel concept for varying the pilot density. The pilot density in the transmission stream has the following consequence: Too many pilots ensure a better knowledge of the channel at the receiver, hence better channel equalization and lower errors, however since the resources are usually limited, transmitting too many pilots reduces the resources available to transmit the actual user data. Latency of a communication system defines the time that a message generated at the transmitter arrives to the receiver. It includes all processing steps and propagation delays in the system. There is a natural contradiction between the latency and reliability of a communication system. Usually, delivering information quickly (short latency) would result in degraded reliability. The idea of the application is to provide a trade-off between latency and reliability. This trade-off is based on an improved pilot design for balancing the reliability, latency and throughput of a communication system.

The disclosure introduces a well-defined framework where the transmitter can adaptively modify the pilot spacing in time/frequency according to the latency deadline of the service and the channel statistics. In one example, where two services operate at exactly the same channel but with different latency requirements, the service with shorter latency may have less pilots than the service with higher latency in order to boost its throughput and reduce the latency at the same time.

The disclosure introduces a scheme for selecting the pilot density according to a constrained optimization function which may include an indicator of reliability and an indicator of throughput, while being constrained to the latency of service. The optimization task can for example abstractly be defined as:

$$\mathrm{argmax} \frac{\text{Reliability}}{\text{Pilot overhead}}$$

with a channel estimation window being smaller than the latency constraint. The channel estimation window defines the location of pilots in time/frequency relative to a data symbol, which can be used for channel estimation. The latency deadline of a service restricts the channel estimation window in time to the maximum future symbol which can be used for estimating the channel at the current data symbol. For example, if the latency of the system is restricted to one multicarrier symbol, then the channel estimation window can only use current and past pilots but not future pilots, since they lie beyond the latency constraint. Once the optimal pilot spacing in time/frequency is found, the transmitter may select the closest pilot pattern from a palette of predefined pilot patterns which is known to the receiver. At the receiver side, instead of sacrificing resources for signaling the chosen pilot pattern to the receiver, the receiver can blindly detect the pilot pattern according to distinct features of the pilot sequence. In this way, the transmitter can quickly change the pilot pattern without continuously occupying the control channel with a message indicating the chosen pilot pattern. The basic pilot pattern, also referred to as base pilots, is always present and has the lowest pilot density. This ensures that the receiver can always equalize the channel according to the base pilots even if it fails to detect the presence of other pilots.

In the following description, radio signals in time-frequency domain are defined. Such radio signals may have a basic structure according to LTE standard as shown in FIG. 1. This figure shows a schematic diagram of a radio signal 100 in a time-frequency representation according to LTE. The radio signal 100 comprises frequency resources in frequency direction 101, for example 12 subcarriers 103 and time resources in time direction 102, for example 14 symbols 104. In LTE a number of 14 symbols may span 2 slots 105 in time direction 102 and may have a duration of 1 millisecond. The time-frequency resources are partitioned in resource elements 106. The whole resource elements 106 depicted in FIG. 1 form a resource block. A resource block may have a different number of resource elements 106 depending on the definition of a cyclic prefix and other parameters. FIG. 1 is just an example for such a resource block. A first section 108 of the resource block, e.g. defined by the first three symbols R, 2, 3 in time direction including its frequency resources in frequency direction, may form a control section of the resource block in which resource elements carry control data. A second section 109 of the resource block, e.g. defined by the symbols 4, 5, 6, 7, R, 2, 3, 4, 5, 6, 7 in time direction including its frequency resources in frequency direction, may form a data section of the resource block in which resource elements carry user data. Besides the control data and the user data each resource block carries a specific pilot pattern having specific pilots R, 107 distributed over the resource block at known positions, i.e. positions known to the receiver. The pilots, also referred to as reference signals R are inserted at fixed locations in time/frequency as shown in FIG. 1.

The transmission and reception devices described herein may be implemented in wireless communication networks, in particular communication networks based on mobile communication standards such as LTE, in particular LTE-A and/or OFDM. The transmission and reception devices described herein may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives. The transmission and reception devices described herein may be configured to transmit and/or receive radio signals. Radio signals may be or may include radio frequency signals radiated by a radio transmitting device (or radio transmitter or sender) with a radio carrier frequency lying in a range of about 3 Hz to 300 GHz. The frequency range may correspond to frequencies of alternating current electrical signals used to produce and detect radio waves.

The transmission and reception devices described herein may be designed in accordance to mobile communication standards such as e.g. the Long Term Evolution (LTE) standard or the advanced version LTE-A thereof. LTE (Long Term Evolution), marketed as 4G LTE and beyond, is a standard for wireless communication of high-speed data for mobile phones and data terminals.

The transmission and reception devices described herein may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The transmission and reception devices described herein may include MAC (media access control) modules for generating or processing transport blocks. The MAC module implements the MAC protocol sublayer that exists in UE and eNodeB. It is part of the LTE air interface control and user planes. The main services and functions of the MAC sublayer include: Mapping between logical channels and transport channels; Multiplexing and demultiplexing of MAC SDUs (service data units) belonging to one or different logical channels into/from transport blocks (TB) delivered to/from the physical layer on transport channels; scheduling information reporting; Error correction through HARQ (hybrid automatic repeat request) protocol; Priority handling between logical channels of one UE; Priority handling between UEs by means of dynamic scheduling; Transport format selection; and Padding. The MAC protocol sublayer is for example specified in 3GPP TS 36.321—Evolved Universal Terrestrial Radio Access (E-UTRA); Medium Access Control (MAC) protocol specification.

In order to describe the application in detail, the following terms, abbreviations and notations will be used:
BS: Base Station, eNodeB, eNB
UE: User Equipment, e.g. a mobile device or a machine type communication device
V2X: Vehicle to Infrastructure
V2V: Vehicle to Vehicle
4G: 4th generation according to 3GPP standardization
5G: 5th generation according to 3GPP standardization
LTE: Long Term Evolution
MTC: Machine Type Communication
BLE: Block Error Rate
FDD: Frequency Division Duplex
TDD: Time Division Duplex
TTI: Transmission Time Interval
MCS: Modulation and Coding Scheme or Set
CSI: Channel State Information
UL: Uplink
DL: Downlink
CQI: Channel Quality Information
MAC: Media Access Control
LA: Link Adaptation
TB: Transport Block
RM: Rate Matcher
(I)DFT: (Inverse) Discrete Fourier Transform
(I)FFT: (Inverse) Fast Fourier Transform
M2M: Machine to Machine
LTE-M: Machine to Machine version of LTE
D2D: Device to Device
RF: Radio Frequency
BEP: Bit Error Probability
MSE: Mean Square Error
SNR: Signal to Noise Ratio
QoS: Quality of Service According to a first aspect, the application relates to a transmission device for transmitting a radio signal over a radio channel, the transmission device comprising: a radio signal generator, configured to generate a radio signal in time-frequency domain; a channel state information (CSI) interface, configured to receive CSI of the radio channel; a pilot generator, configured to compose a pilot signal from at least one pre-defined pilot signal, wherein a number and a location of the at least one pre-defined pilot signal in the composed pilot signal is determined based on at least one of a latency requirement and/or the received CSI; a pilot insertion unit, configured to insert the composed pilot signal into the radio signal; and a transmission unit configured to transmit the radio signal comprising the inserted composed pilot signal.

This provides the advantage that by determining a number and a location of the at least one pre-defined pilot signal in the composed pilot signal based on at least one of a latency requirement and/or the received CSI data throughput can be increased without decreasing reliability. The transmission device can be applied in mobile communication systems such as LTE. In a first possible implementation form of the transmission device according to the first aspect, the transmission device further comprises a look-up table having predetermined values indicating a dependency of the number and the location of the at least one predefined pilot signal in the composed pilot signal on the latency requirement and/or the received CSI.

This provides the advantage that the number and the location of the at least one pre-defined pilot signal in the composed pilot signal can be efficiently determined.

In a second possible implementation form of the transmission device according to the first aspect as such or according to the first implementation form of the first aspect, the latency requirement comprises a transmission delay requirement, and/or a propagation delay of the radio channel, in particular a propagation delay in terms of timing advance (TA).

This provides the advantage that all parameters contributing to an overall system latency can be considered for generating the optimum pilot pattern which results in increased data throughput at high reliability. The timing advance parameter indicates an adjustment for an uplink transmission timing of the transmission device. The timing advance parameter can be generated by a base station to inform a UE the correct transmission time in order to receive the uplink frame at the correct time frame.

A third possible implementation form of the transmission device according to the first aspect as such or according to any one of the preceding implementation forms of the first aspect, the received CSI indicates an estimate of the radio channel, in particular in terms of coherence bandwidth, and/or coherence time, and/or signal energy, and/or signal-to-noise ratio.

This provides the advantage that the pilot pattern can be matched to the radio channel characteristics, in particular in terms of coherence bandwidth, and/or coherence time, and/or signal energy, and/or signal-to-noise ratio to provide optimum data throughput at high accuracy for such a channel characteristic.

In a fourth possible implementation form of the transmission device according to the first aspect as such or according to any one of the preceding implementation forms of the first aspect, the pilot insertion unit is configured to insert the composed pilot signal on a transmission time interval (TTI) basis, wherein the composed pilot signal for a current TTI is achieved by using the dependency on the CSI received for a previous TTI.

This provides the advantage that the pilot pattern can be optimally generated for each TTI. When the composed pilot signal for a current TTI is achieved by using the dependency on the CSI received for a previous TTI an accuracy of data transmission can be increased at low computational complexity.

In a fifth possible implementation form of the transmission device according to the fourth implementation form of the first aspect, the pilot generator is configured to compose the pilot signal for a TTI based on a set of base pilot patterns, each base pilot pattern corresponding to a combination of a specific latency requirement and a specific CSI.

This provides the advantage that the base pilot pattern is known to the receiver and be used for supporting specific latency requirement or a specific CSI.

In a sixth possible implementation form of the transmission device according to the fifth implementation form of the first aspect, the pilot generator is configured to compose the pilot signal for a TTI further according to at least one set of dynamic pilot patterns, wherein each of the dynamic pilot patterns has pilot positions different from each other and different from the base pilot pattern. Usually, at least two sets of dynamic pilots are needed to cover different channel conditions.

This provides the advantage that the base pilot pattern is known to the receiver and can be used for a rough estimation result which can be refined by using further pilots from dynamic pilot patterns.

In a seventh possible implementation form of the transmission device according to the sixth implementation form of the first aspect, the pilot generator is configured to select the at least one set of dynamic pilot patterns in order to minimize a channel estimation error indicated by the received CSI for the latency requirement.

This provides the advantage that a minimal channel estimation error results in a high accuracy of data transmission.

In an eighth possible implementation form of the transmission device according to the seventh implementation form of the first aspect, pilot positions of dynamic pilot patterns not selected by the pilot generator carry user data.

This provides the advantage that some resource elements can be flexibly assigned to dynamic pilots or data symbols. This increases accuracy in non-reliable channels by using dynamic pilots to improve channel estimation. Besides, data throughput can be increased for reliable channels by using a higher number of data symbols per resource block.

In a ninth possible implementation form of the transmission device according to any one of the sixth to the eighth implementation forms of the first aspect, the transmission unit is configured to signal the used dynamic pilot patterns to a reception device.

This provides the advantage that the reception device knows the used pilot pattern and can save time for detecting which pilots are used. Hence, a computational complexity of the transmission device can be reduced.

In a tenth possible implementation form of the transmission device according to any one of the second to the ninth implementation forms of the first aspect, the composed pilot signal inserted for a TTI is a subset or a superset of the composed pilot signal inserted for another TTI.

This provides the advantage that a resolution of the pilots in the pilot pattern can be flexibly controlled depending on the channel conditions.

In an eleventh possible implementation form of the transmission device according to any one of the second to the ninth implementation forms of the first aspect, pilots of the set of dynamic pilot patterns have at least one of the following properties: a higher signal power than data symbols, a constellation that is different than the constellation of the data symbols, a predefined pseudo-random sequence.

This provides the advantage that the pilots of the set of dynamic pilot patterns can be easily detected by using blind channel detection. No signaling of used pilot pattern from transmitter to receiver is required. This saves signaling overhead.

According to a second aspect, the application relates to a reception device for receiving a radio signal over a radio channel, the reception device comprising: a receiver, configured to receive a radio signal comprising a composed pilot signal which comprises a predefined base pilot pattern and an optional set of pre-defined dynamic pilot patterns; a detector, configured to detect if the optional set of dynamic pilot patterns is present in the composed pilot signal; and a channel estimator, configured to estimate the radio channel based on the base pilot pattern if no optional set is detected by the detector, or based on both, the base pilot pattern and dynamic pilot patterns from the optional set if the optional set is detected by the detector.

This provides the advantage that by using a pre-defined base pilot pattern and an optional set of pre-defined dynamic pilot patterns, data throughput can be flexibly increased together with reliability. The reception device can be applied in mobile communication systems such as LTE.

In a first possible implementation form of the reception device according to the second aspect, the detector is configured to detect the optional set of dynamic pilot patterns based on blind detection or based on a signaling message.

This provides the advantage that the reception device is flexible for detecting the optional set of dynamic pilot patterns.

In a second possible implementation form of the reception device according to the second aspect as such or according to the first implementation form of the second aspect, the reception device comprises a selector, configured to select dynamic pilot patterns of the detected optional set to be used by the channel estimator.

This provides the advantage that a complexity of the channel estimator can be flexibly adjusted based on the received pilot pattern.

In a third possible implementation form of the reception device according to the second aspect as such or according to any one of the preceding implementation forms of the second aspect, the detector is configured to detect the optional set based on at least one of the following detection criteria: pilots of the optional set have a higher signal power than data symbols, a constellation of the pilots of the optional set is phase-shifted with respect to a constellation of the data symbols, the pilots of the optional set have a predefined pseudo-random sequence.

This provides the advantage that the pilots of the set of dynamic pilot patterns can be easily detected by using blind sequence detection. No signaling of used pilot pattern from transmitter to receiver is required. This saves signaling overhead.

According to a third aspect, the application relates to a wireless system where pilots are inserted in the signal (e.g. Transmission Time Interval (TTI)), the pilots of the current TTI are dynamically allocated depending on the latency deadline and/or on the CSI of previous TTI.

This provides the advantage that by dynamically allocating pilots depending on the latency deadline and/or on the CSI of previous TTI data throughput can be increased without decreasing reliability. The wireless system can be an LTE communication system.

In a first possible implementation form of the wireless system according to the third aspect, the pilot spacing is chosen to optimize a performance metric function, which combines indicators of reliability and pilot overhead.

In a second possible implementation form of the wireless system according to the third aspect as such or according to the first implementation form of the third aspect, for each given latency, the channel estimation window is adjusted in order to fit into the latency deadline.

According to a fourth aspect, the application relates to a wireless system where pilots are grouped into base pilots, which are fixed from one TTI to the next, and dynamic pilots whose existence depends on a constrained latency and for a given achievable reliability, where at least the positions of a portion of the pilots (called the dynamic pilots) can be used for transmitting user data (e.g. for low latency transmission).

In a first possible implementation form of the wireless system according to the fourth aspect, the pilots are allocated in an incremental/decremental way, meaning that the set of the pilot positions in a resource block in a TTI is a subset or superset of the pilot positions of the same resource block in another TTI.

In a second possible implementation form of the wireless system according to the fourth aspect as such or according to the first implementation form of the fourth aspect, the dynamic pilots have unique constellation points.

In a third possible implementation form of the wireless system according to the fourth aspect as such or according to any of the preceding implementation forms of the fourth aspect, the pilot constellations/patterns are either signaled via a control channel, or detected blindly at the receiver.

In a fourth possible implementation form of the wireless system according to the fourth aspect as such or according to any of the preceding implementation forms of the fourth aspect, the dynamic pilot symbols have higher signal power than data symbols.

In a fifth possible implementation form of the wireless system according to the fourth aspect as such or according to any of the preceding implementation forms of the fourth aspect, the pilots are pseudo-random sequence.

BRIEF DESCRIPTION OF DRAWINGS

Further embodiments of the application will be described with respect to the following figures, in which.

DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 2:
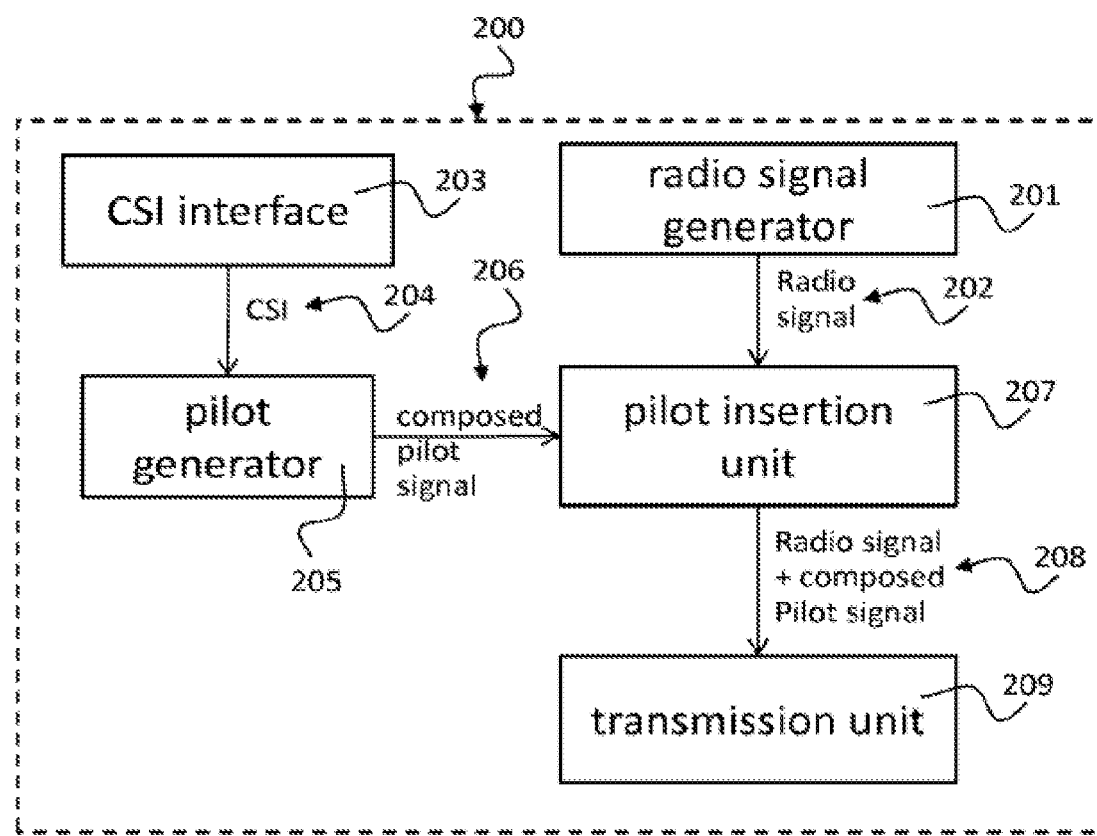
FIG. 2 shows a block diagram illustrating a transmission device 200 according to an implementation form.

FIG. 2 shows a block diagram illustrating a transmission device 200 for transmitting a radio signal 202 over a radio channel according to an implementation form. The transmission device 200 includes a radio signal generator 201, a channel state information (CSI) interface 203, a pilot generator 205, a pilot insertion unit 207 and a transmission unit 209.

Figure 1:
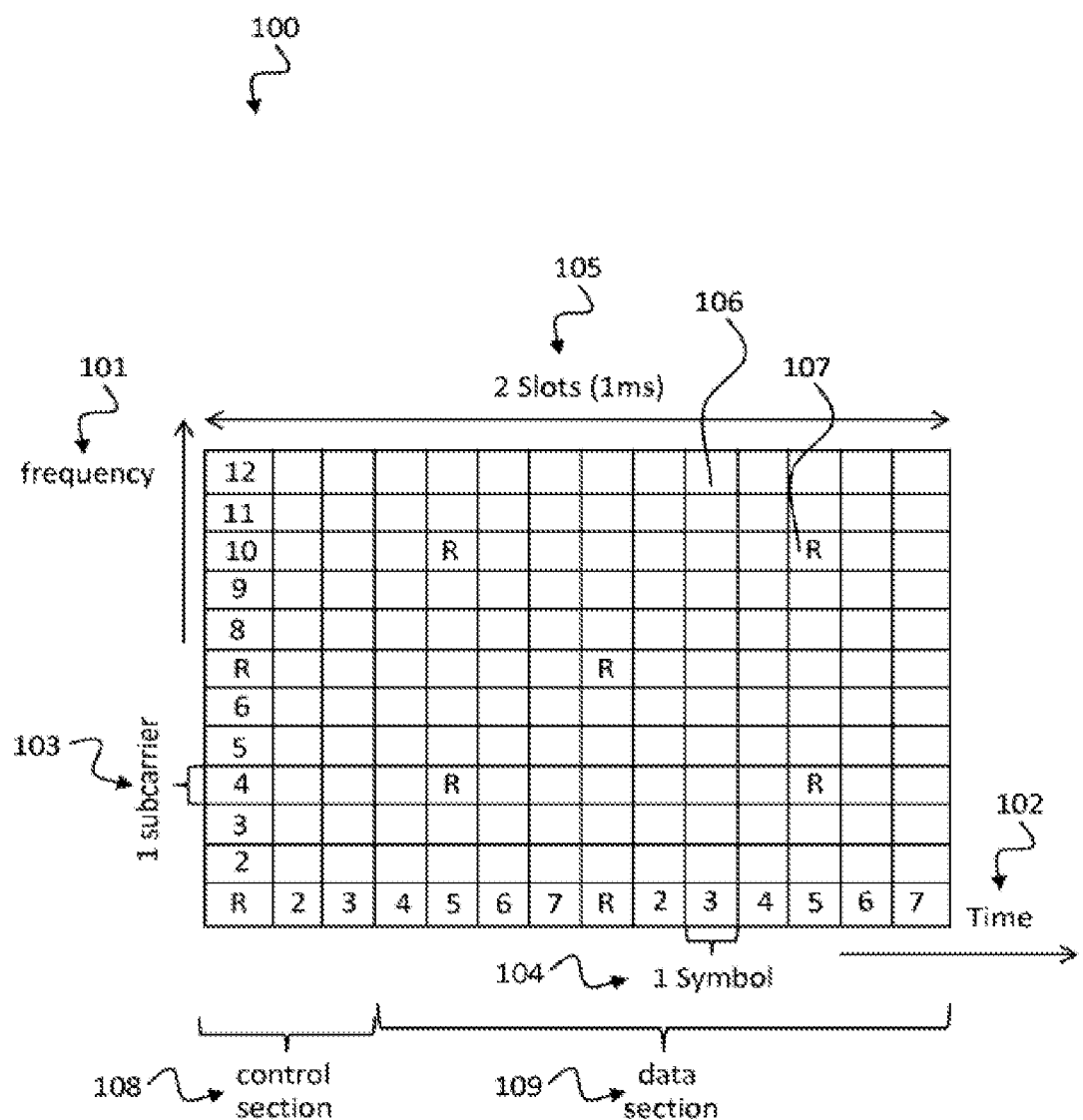
FIG. 1 shows a schematic diagram of a radio signal 100 in a time-frequency representation according to LTE.

The radio signal generator 201 is configured to generate a radio signal 202 in time-frequency domain, e.g. according to the representation of FIG. 1. The CSI interface 203 is configured to receive CSI 204 of the radio channel. The pilot generator 205 is configured to compose a pilot signal 206 from at least one pre-defined pilot signal, wherein a number and a location of the at least one pre-defined pilot signal in the composed pilot signal 206 is determined based on at least one of a latency requirement and/or the received CSI 204. The pilot insertion unit 207 is configured to insert the composed pilot signal 206 into the radio signal 202. The transmission unit 209 is configured to transmit the radio signal comprising the inserted composed pilot signal 208.

The transmission device 200 may further include a look-up table having predetermined values indicating a dependency of the number and the location of the at least one predefined pilot signal in the composed pilot signal 206 on the latency requirement and/or the received CSI 204.

The latency requirement may include a transmission delay requirement, and/or a propagation delay of the radio channel, for example a propagation delay in terms of timing advance. The received CSI 204 may indicate an estimate of the radio channel, for example in terms of coherence bandwidth, and/or coherence time, and/or signal energy, and/or signal-to-noise ratio.

The pilot insertion unit 207 may be configured to insert the composed pilot signal 206 on a transmission time interval (TTI) basis, wherein the composed pilot signal 206 for a current TTI is achieved by using the dependency on the CSI 204 received for a previous TTI.

The pilot generator 205 may be configured to compose the pilot signal 206 for a TTI based on a set of base pilot patterns, e.g. base pilot patterns 601 as described below with respect to FIG. 6 or base pilot patterns 801 as described below with respect to FIG. 8. Each base pilot pattern 601 may correspond to a combination of a specific latency requirement and a specific CSI 204. The pilot generator 205 may be configured to compose the pilot signal 206 for a TTI further according to at least one set of dynamic pilot patterns, e.g. dynamic pilot patterns 602, 603 as described below with respect to FIG. 6 or dynamic pilot patterns 802 as described below with respect to FIG. 8. Each of the dynamic pilot patterns 602, 603, 802 may have pilot positions different from each other and different from the base pilot pattern 601, 801.

The pilot generator 205 may be configured to select the at least one set of dynamic pilot patterns 602, 603, 802 in order to minimize a channel estimation error indicated by the received CSI 204 for the latency requirement. Pilot positions of dynamic pilot patterns 602, 603, 802 not selected by the pilot generator 205 may carry user data.

The transmission unit 209 may be configured to signal the used dynamic pilot patterns 602, 603, 802 to a reception device, e.g. a reception device 300 as described below with respect to FIG. 3 or a reception device as described below with respect to FIG. 11 or a reception device 1400 as described below with respect to FIG. 14.

The composed pilot signal 206 inserted for a TTI may be a subset or a superset of the composed pilot signal 206 inserted for another TTI.

Pilots of the set of dynamic pilot patterns 602, 603, 802 may have at least one of the following properties: a higher signal power than data symbols, a constellation which is different than the constellation of the data symbols, a pre-defined pseudo-random sequence, e.g. as described below with respect to FIGS. 7 to 10.

Figure 3:
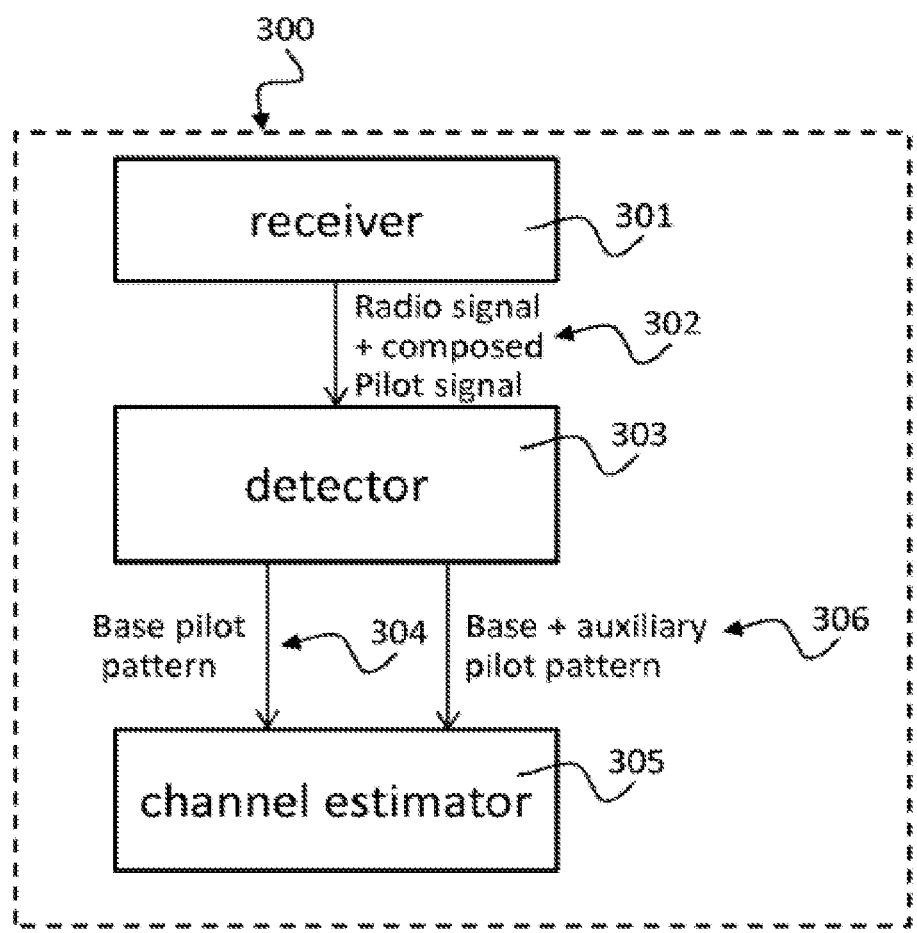
FIG. 3 shows a block diagram illustrating a reception device 300 according to an implementation form.

FIG. 3 shows a block diagram illustrating a reception device 300 for receiving a radio signal 302 over a radio channel according to an implementation form. The reception device 300 includes a receiver 301, a detector 303 and a channel estimator 305.

The receiver 301 is configured to receive a radio signal, e.g. according to the representation of FIG. 1, wherein the radio signal includes a composed pilot signal 302, e.g. a composed pilot signal 206 generated by the pilot generator 205 described above with respect to FIG. 2. The composed pilot signal 302 includes a pre-defined base pilot pattern 601, e.g. a base pilot pattern 601 as described below with respect to FIG. 6 or a base pilot pattern 801 as described below with respect to FIG. 8, and an optional set of pre-defined dynamic pilot patterns, e.g. dynamic pilot patterns 602, 603 as described below with respect to FIG. 6 or dynamic pilot patterns 802 as described below with respect to FIG. 8.

The detector 303 is configured to detect if the optional set of dynamic pilot patterns 602, 603, 802 is present in the composed pilot signal 302.

The channel estimator 305 is configured to estimate the radio channel based on the base pilot pattern 304, 601, 801 if no optional set is detected by the detector 303, or based on both 306, the base pilot pattern 601, 801 and dynamic pilot patterns 602, 603, 802 from the optional set if the optional set is detected by the detector 303.

The detector 303 may be configured to detect the optional set of dynamic pilot patterns 602, 603, 802 based on blind detection or based on a signaling message, e.g. as described below.

The reception device 300 may include a selector, configured to select dynamic pilot patterns 602, 603, 802 of the detected optional set to be used by the channel estimator 305.

The detector 303 may be configured to detect the optional set based on at least one of the following detection criteria: pilots of the optional set have a higher signal power than data symbols, a constellation of the pilots of the optional set is different than a constellation of the data symbols, the pilots of the optional set have a predefined pseudo-random sequence, e.g. as described below with respect to FIGS. 7 to 10.

Figure 4:
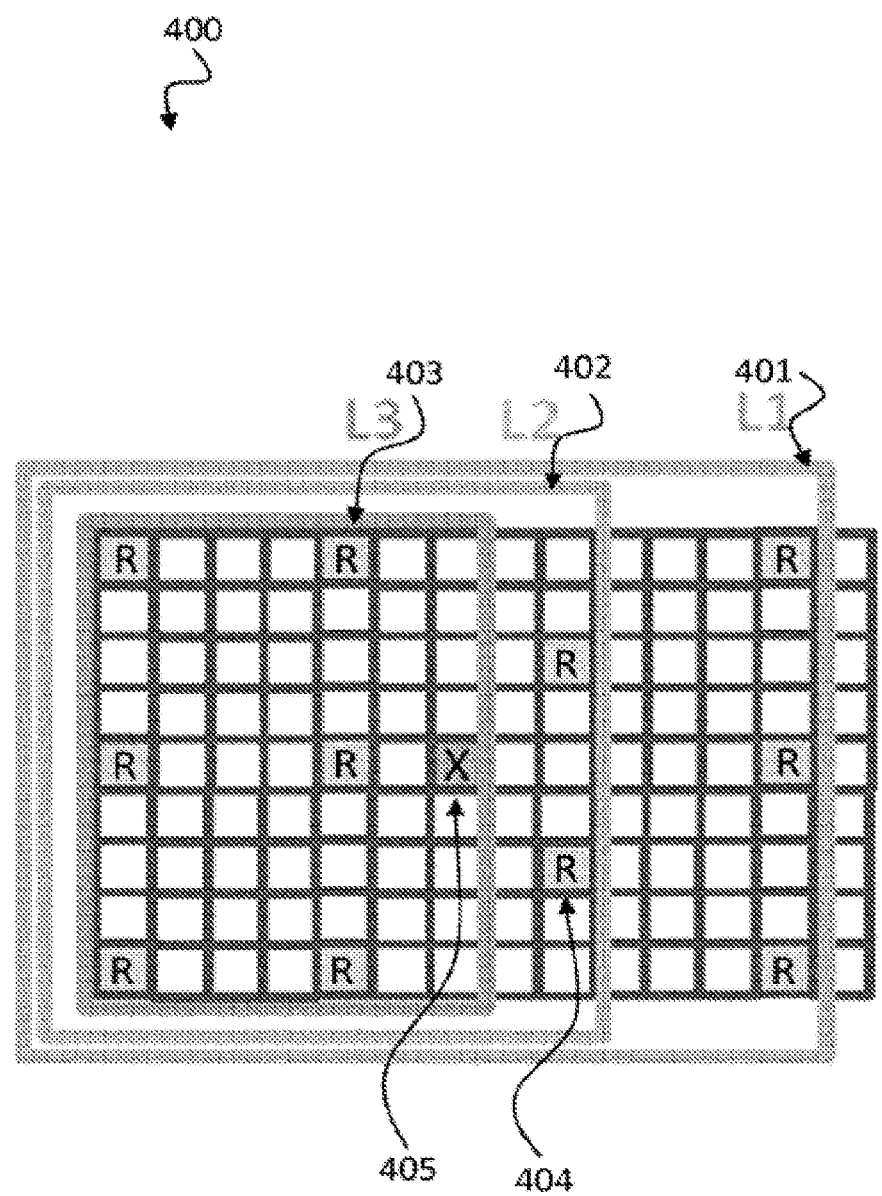
FIG. 4 shows a schematic diagram of a radio signal 400 in a time-frequency representation for three different latency requirements L1, L2, L3 according to an implementation form.

FIG. 4 shows a schematic diagram of a radio signal 400 in a time-frequency representation for three different latency requirements L1, L2, L3 according to an implementation form.

FIG. 4 illustrates the choice of the optimal pilot spacing according to an optimization function, which combines reliability and throughput with the restriction on latency.

Reliability measures how well the receiver can equalize the received signal and compensate for the channel distortions. One of the most important factors of reliability is channel estimation. In order to find the channel response at a certain data symbol, the channel estimation filter uses a weighted combination of the channel response at the neighboring pilot positions. The channel estimation window can be designed as shown in FIG. 4 where R 404 refer to all pilots and X 405 refers to the considered data element.

For each latency requirement, a channel estimation window 401, 402, 403 is constructed which defines the pilots R 404 used for channel estimation. For example, consider the data element X 405. In order to estimate the channel at this location X 405, a combination of the channel responses at the pilot resource elements R, 404 may be used. For high latency applications (L1), the Transmission Time Interval (TTI) is large and hence the filter can make use of future pilots as indicated in the L1 channel estimation window 401. For low latency applications (L3), only current and past pilots can be used as shown in the figure. In this situation, the TTI is short and hence the filter can make use of pilots as indicated in the L3 channel estimation window 403. For medium latency applications (L2), the TTI is medium and hence the filter can make use of pilots as indicated in the L2 channel estimation window 402.

For each channel estimation window 401, 402, 403, and each set of used pilots, there is a theoretical floor of the Mean Estimation Error (MSE). This is the minimum possible channel estimation error for a given pilot separation and channel's second order statistics (Doppler shift and Root Mean Squared delay).

The MSE can be represented as $$MSE = \frac{1}{Nd} Tr\{R_{yy} - R_{yx} R_{xx}^{-1} R_{yx}^{H}\}$$

with $N_d$ being the number of data elements with unique spacing to the pilots. $R_{yy}$ is the auto-covariance matrix of the channel response at all data locations. $R_{yx}$ is the cross-covariance matrix between the channel response at the data locations and pilot locations, and $R_{xx}$ is the auto-covariance matrix of the channel response at the pilot locations.

Figure 5:
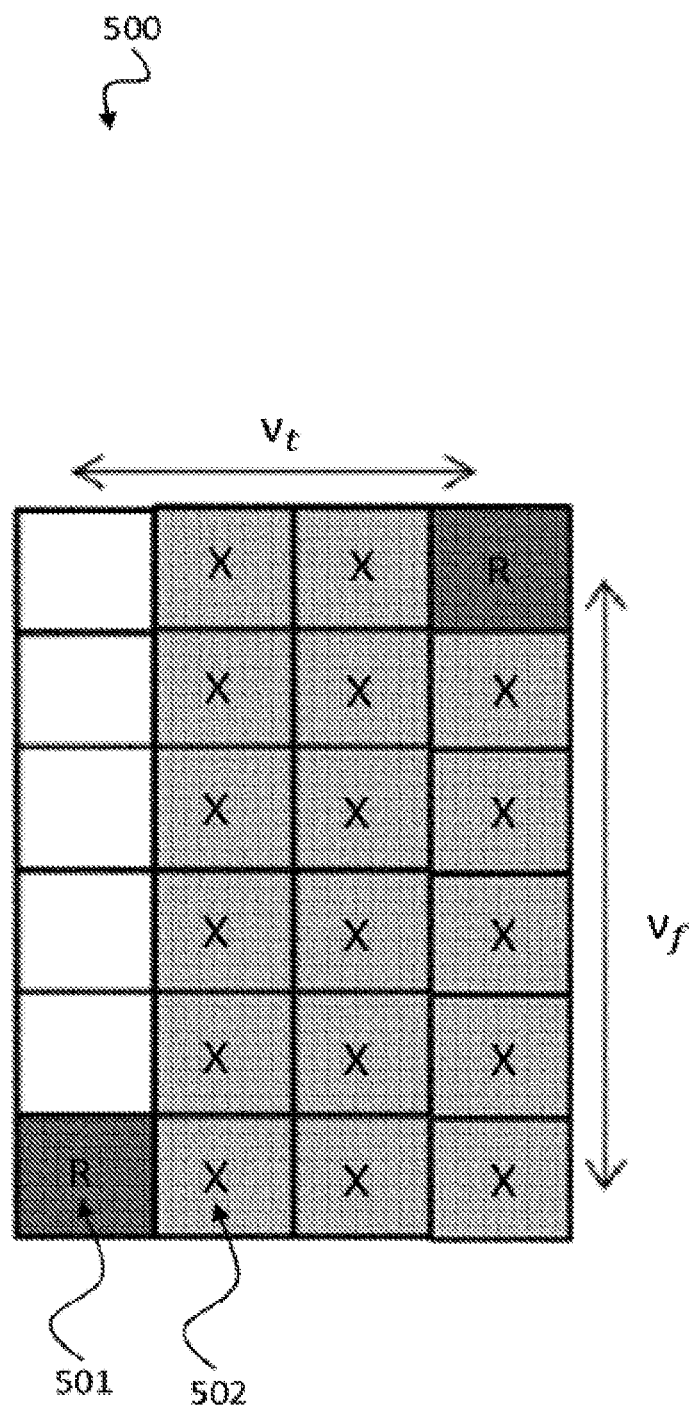
FIG. 5 shows a schematic diagram of a radio signal 500 in a time-frequency representation having a specific pilot pattern according to an implementation form

FIG. 5 shows a schematic diagram of a radio signal 500 in a time-frequency representation having a specific pilot pattern according to an implementation form. R 501 illustrate pilots while X 502 illustrate data considered for MSE estimation.

The covariance matrices presented above with respect to FIG. 4 depend on the channel's fading (in terms of second order characteristics) and the absolute distance between pilots in seconds/Hz. The MSE is applied to the periodic structure shown in FIG. 5. In this structure, the distance between pilots R 501 in time is defined as $v_t$ (3 multicarrier symbols), and in frequency is $v_f$ (5 subcarriers). The MSE takes as an input the SNR, Doppler shift, RMS (root mean square) delay, pilot spacing in time $v_t$ and frequency $v_f$. The Doppler shift can be used to determine the coherence time, e.g. as $$\frac{0.423}{\text{Doppler shift}}.$$

The RMS delay can be used to determine the coherence bandwidth, e.g. as $$\frac{1}{50 \times (RMS \text{ Delay})} \text{ or } \frac{1}{5 \times (RMS \text{ Delay})}.$$

For a given transmit power, the transmitter has no control over the SNR, Doppler shift or RMS delay, but can modify the pilot spacing to influence the MSE. After obtaining the MSE, the bit error probability (BEP) can be computed according to reference functions of demodulation. At the end, the BEP represents the indicator of the reliability of the link, which can be partially controlled by tuning the pilot spacing.

Pilots are usually used to estimate the channel's second order statistics. A state-of-the-art estimation method is given as follows: To estimate the coherence time or Doppler shift, the auto-correlation function of the channel's response can be calculated for different time shifts.

The estimated auto-correlation function is then mapped into reference curves, to obtain an estimate of the coherence time. An example of the reference auto-correlation curves is the zero-th order Bessel's function of first kind.

Similarly, pilots are usually used to estimate the coherence bandwidth or RMS delay by comparing an estimated auto-correlation function to reference auto-correlation function. For example, for an exponential decaying power delay profile, the reference autocorrelation function is known to be $$\frac{1}{1 + j2\pi\tau_{rms}kf_{sc}},$$

where $\tau_{rms}$ is the reference RMS delay, k is the subcarrier shift, and $f_{sc}$ is the subcarrier spacing. In another possible implementation, the inverse Fourier transform of the estimated channel's frequency response may be computed. This yields an estimate of the Power Delay Profile (PDP). The RMS delay can then be easily computed from the Power Delay Profile. Besides these, other state-of-the-art methods can also be employed to determine the coherence bandwidth.

Similarly, many state-of-the-art methods can be used to estimate the received signal energy, signal power, or signal to noise ratio, e.g. by using pilots. Usually, the more pilots are used, the less the estimation MSE and the more accurate the estimation will be. In case the reliability or QoS is fulfilled, the higher the density of the pilots, the lower the throughput. Hence the ratio of pilot elements to total elements can be used which can be represented as $$\frac{1}{v_t \cdot v_f}.$$

This ratio indicates the actual throughput of the link excluding pilots.

By combining the latency restricted reliability and throughput indicators mentioned above, the optimal pilot spacing can be determined. Note, that this optimization process can be done offline for all possible parameters, such as SNR, Doppler RMS delay, etc. At the end the transmitter may have a look up table where it may simply extract the optimal pilot spacing according to the current channel statistics.

In an exemplary implementation, pilots may be inserted in the signal (e.g. Transmission Time Interval (TTI)), the pilots of the current TTI may be dynamically allocated depending on the latency deadline and/or on the CSI of previous TTI. The longer the tolerable latency or the better the channel, the less pilots need to be allocated. The pilot spacing may be chosen to optimize a performance metric function, which combines indicators of reliability and pilot overhead. For reliability, the Bit Error Probability can be used as an indicator. For pilot overhead, the ratio of resources occupied by pilots to the total resources can be used. For each given latency, the channel estimation window may be adjusted in order to fit into the latency deadline. The shorter the latency, the fewer future pilots can be used for channel estimation, and the higher the bit error probability.

Figure 6:
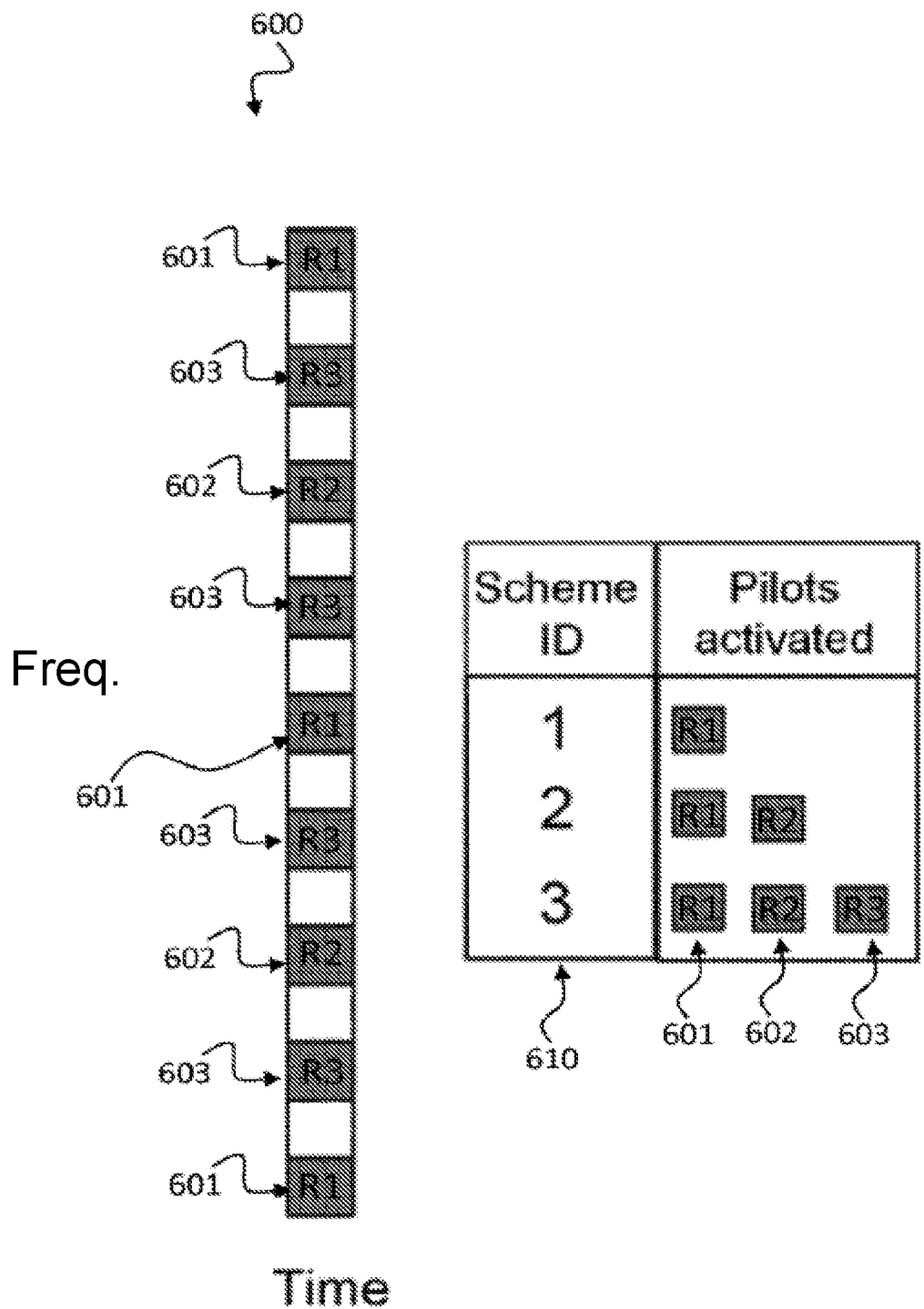
FIG. 6 shows a schematic diagram of a radio signal 600 in a time-frequency representation illustrating activation of different pilot patterns according to an implementation form.

FIG. 6 shows a schematic diagram of a radio signal 600 in a time-frequency representation illustrating activation of different pilot patterns according to an implementation form.

The figure illustrates a well-defined framework, which regulates the transmitter-receiver interaction so that the herein described concept can be used as a practical protocol for standard communications. The system may be limited to a finite set of possible pilot patterns as shown in FIG. 6 where three different schemes 610 are presented. A first scheme includes a base pilot pattern R1 601, a second scheme includes a base pilot pattern R1 601 and a first dynamic pilot pattern R2 602. A third scheme includes a base pilot pattern R1 601 and two dynamic pilot pattern R2 602 and R3 603.

Each pilot pattern corresponds to a certain latency requirement and channel condition. Among the set of pilot patterns, there is a base pilot pattern R1 601 which is present all the time. The other schemes correspond to dynamic pilots R2 602 and R3 603 which may or may not exist as described below.

The transmitter may select the pilot scheme which is closest to the optimal pilot scheme precomputed from the optimization criteria as described above. At the receiver side, the receiver may either receive a control message indicating the chosen pilot pattern, or the receiver can reliably and blindly detect the chosen pattern, e.g. as described below with respect to FIG. 7, hence saving control signaling overhead.

Figure 7:
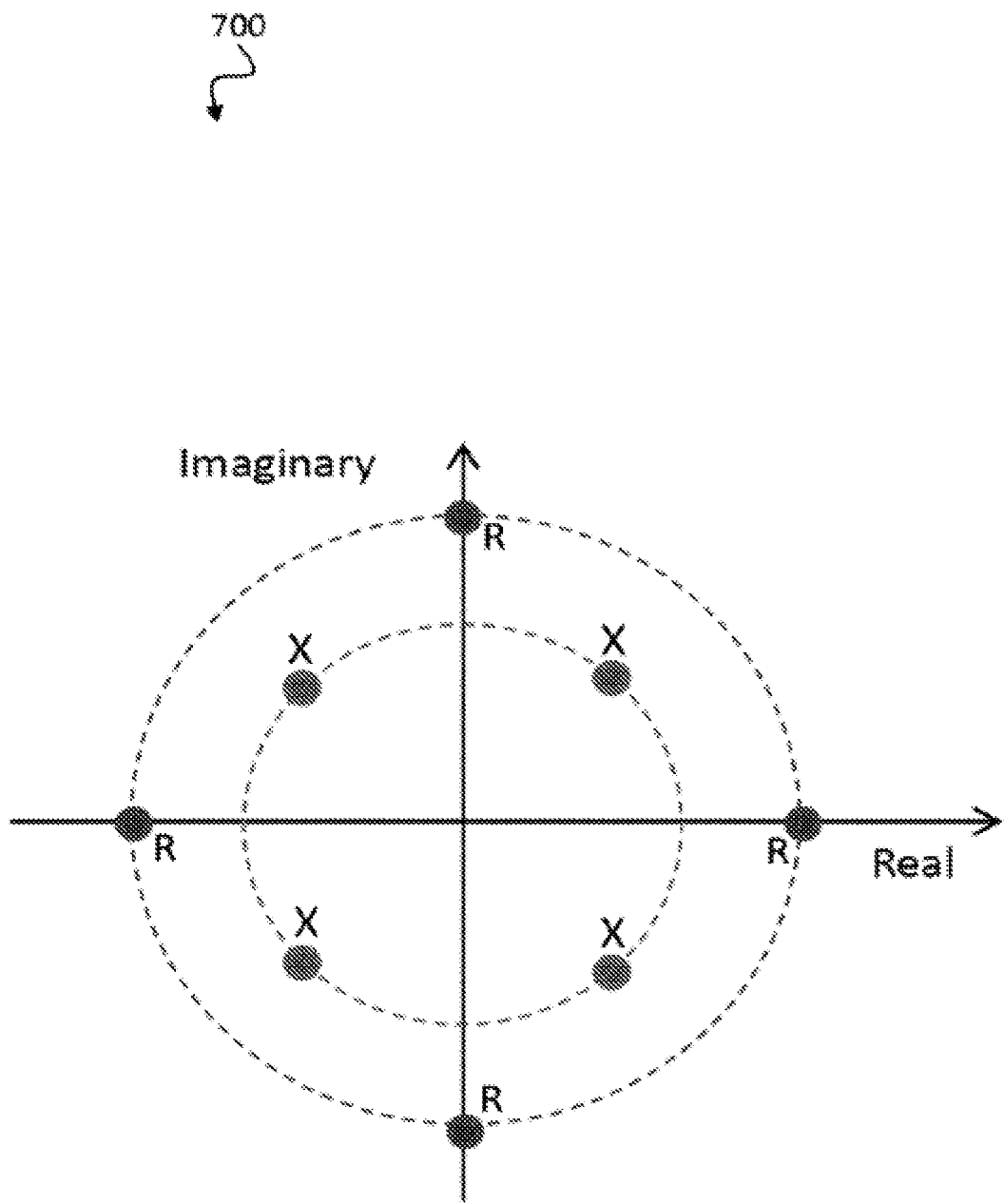
FIG. 7 shows a constellation diagram 700 illustrating dynamic pilot constellation and dynamic data symbol constellation according to an implementation form.

FIG. 7 shows a constellation diagram 700 illustrating dynamic pilot constellation and data symbol constellation according to an implementation form. The constellation includes pilot symbols R forming a dynamic pilot constellation and data symbols X forming a data symbol constellation. The constellation allows to differentiate between pilots R and data symbols X by blind detection as described in the following.

Blind detection can be done according to one of the following methods each tailored to a different class of communications:

Different Constellation Points: In this case, the constellation points of the pilots are different from those of the data elements. For example, for QPSK data elements may have the constellation points $[\pm 1/\sqrt{2}, \pm 1/\sqrt{2}]$, while the pilots have the constellation points $[0, \pm 1]$ and $[\pm 1, 0]$, which is a 45 degrees shift in the constellation points. This may be suitable for low data rate situations such as Machine Type Communications, where the modulation order is low, e.g. BPSK, QPSK.

Different transmit power: Pilots may be transmitted at slightly higher power level compared to data symbols. Hence, by comparing the average SNR at possible pilot locations, to those of data locations, there will be a difference. This approach may be most applicable to situations where power consumption is not critical, such as vehicular communications or factory automation wireless communications.

Pseudo-random noise correlation: Pilots are usually a pseudo-random sequence which is generated from a random sequence generator (e.g. Gold's sequence, Zadoff-Chu sequence in LTE). The receiver may demodulate the possible pilot sequence transmitted by correlating it to the predefined pseudo-random sequence. Once a strong correlation is detected, the receiver can decide that the sequence are pilots and not data. This approach may be suitable to any application, especially low complexity devices, or high data rate devices.

Figure 8:
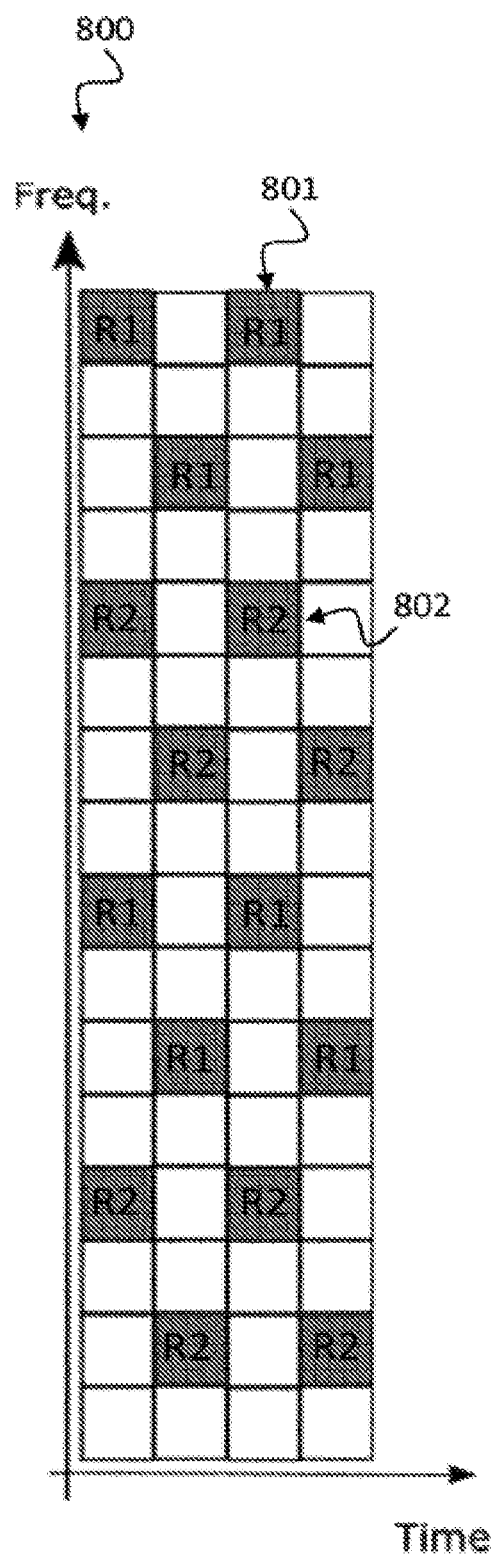
FIG. 8 shows a schematic diagram of a radio signal 800 in a time-frequency representation illustrating a first pilot pattern of type 1 and a second pilot pattern of type 2 according to an implementation form.

FIG. 8 shows a schematic diagram of a radio signal 800 in a time-frequency representation illustrating a first pilot pattern of type 1 and a second pilot pattern of type 2 according to an implementation form.

The figure illustrates an exemplary embodiment of the disclosed concept which summarizes all the parameters described in this disclosure. Initially, the transmitter may obtain channel second order statistics and the service requirements. The optimal pilot spacing may be chosen according to the performance function $$\text{argmax}\left(\frac{\text{Reliability}}{\text{Pilot overhead}}\right)$$

described above.

In the exemplary implementation depicted in FIG. 8, the optimal pilot spacing is 4 subcarriers, i.e. a repetition of one pilot symbol (R1 or R2) and three data symbols (white boxes) in frequency direction. Hence the frame structure looks as depicted in FIG. 8. As shown, there are 2 pilot types (R1 801 and R2 802) activated, referred hereinafter as type 1 and type 2. The performance function may yield a different result where the optimal pilot spacing may be 8 subcarriers, in this case pilots R1 of type 1 may be solely activated or alternatively pilots R2 of type 2 solely activated. The receiver needs to be informed about the pilot scheme used in order to perform channel estimation. The receiver can be informed about the pilot scheme where the transmitter sends a control message with data indicating the pilot scheme used. Hence the receiver may simply decode the control message first and may use the control message to select pilots for channel estimation.

Figure 9:
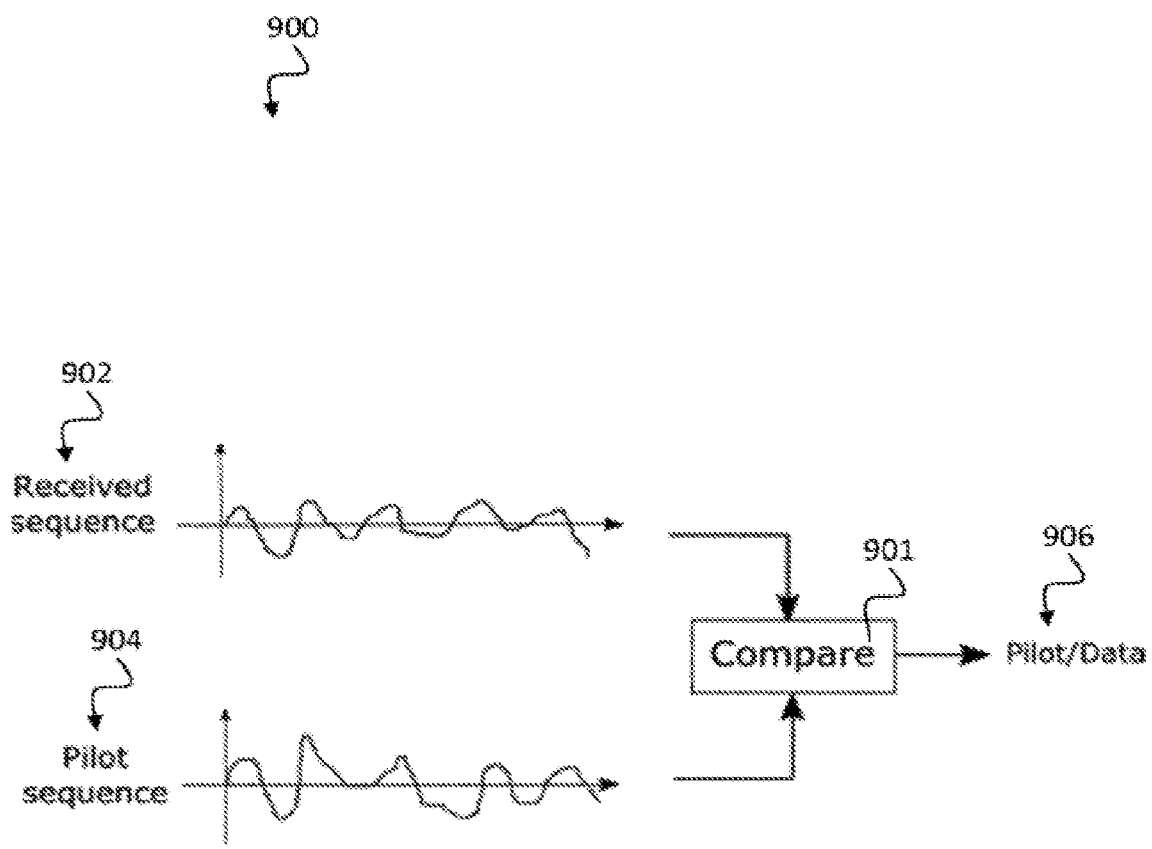
FIG. 9 shows a block diagram of a blind detector 900 for blind detecting pilot and data in a received radio signal according to an implementation form.

FIG. 9 shows a block diagram of a blind detector 900 for blind detecting pilot and data in a received radio signal according to an implementation form.

Figure 10:
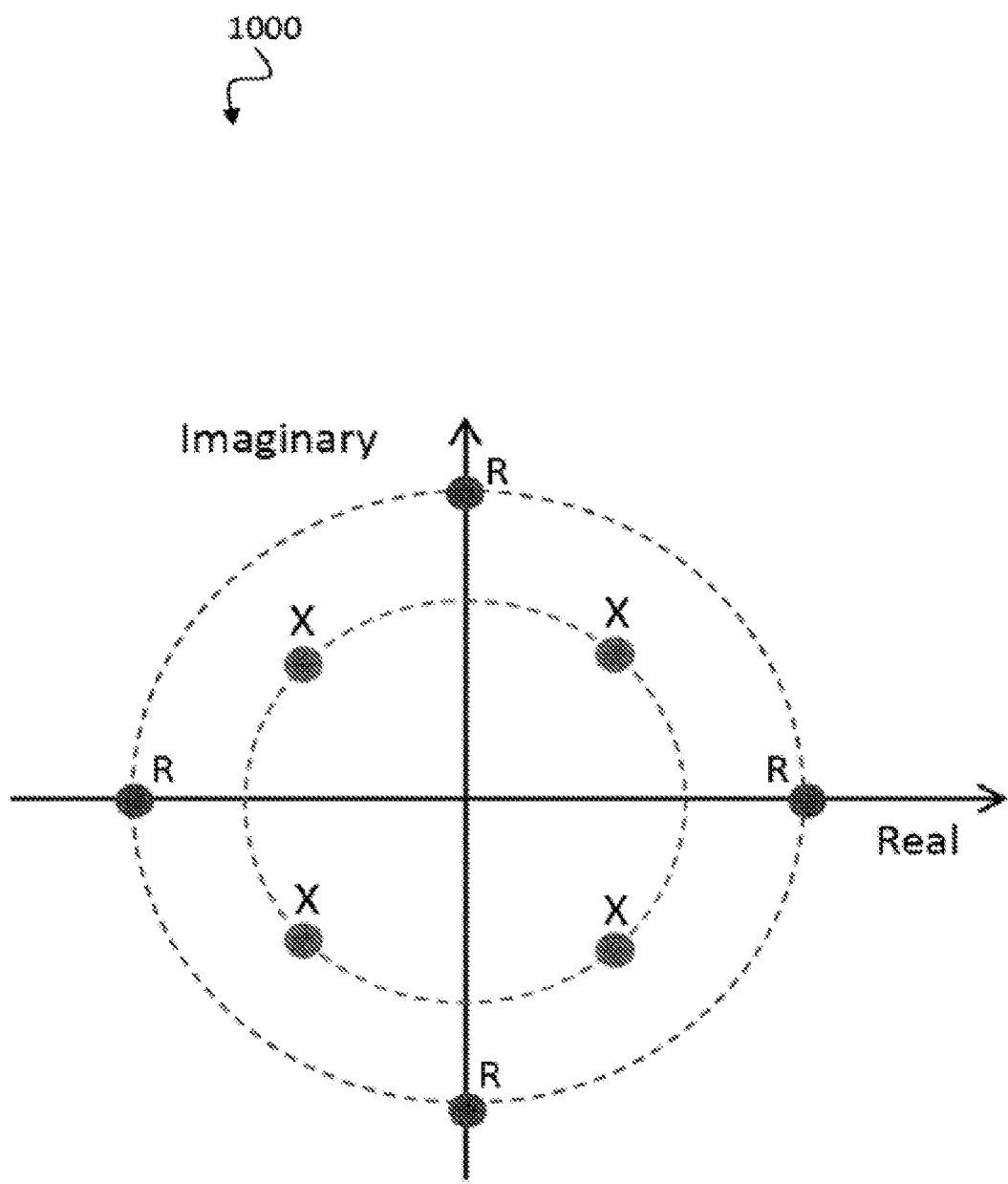
FIG. 10 shows a constellation diagram 1000 illustrating dynamic pilot constellation and dynamic data symbol constellation according to an implementation form.

The receiver may detect the pilot scheme blindly. This means, that the receiver differentiates between the pilot and data without the help of the transmitter. In order to achieve this, the receiver can make use of one of the following assumptions: a) Pilots are transmitted as a sequence 904 of pseudo-random symbols, while data is a totally random sequence. The receiver can compare 901 the suspected pilot sequence 904 with the pseudo-random sequence 902. If the sequences match, then the receiver decides 906 that this sequence is actually a pilot sequence and not a data sequence. If the sequences do not match, then the receiver decides 906 that this sequence is actually a data and not pilot. b) Pilot symbols R have higher power than data symbols X as illustrated in FIG. 10. c) Pilot symbols R are located in a phase shifted constellation compared to data symbols X as illustrated in FIG. 10. Aspects b) and c) are shown in the same FIG. 10.

Figure 11:
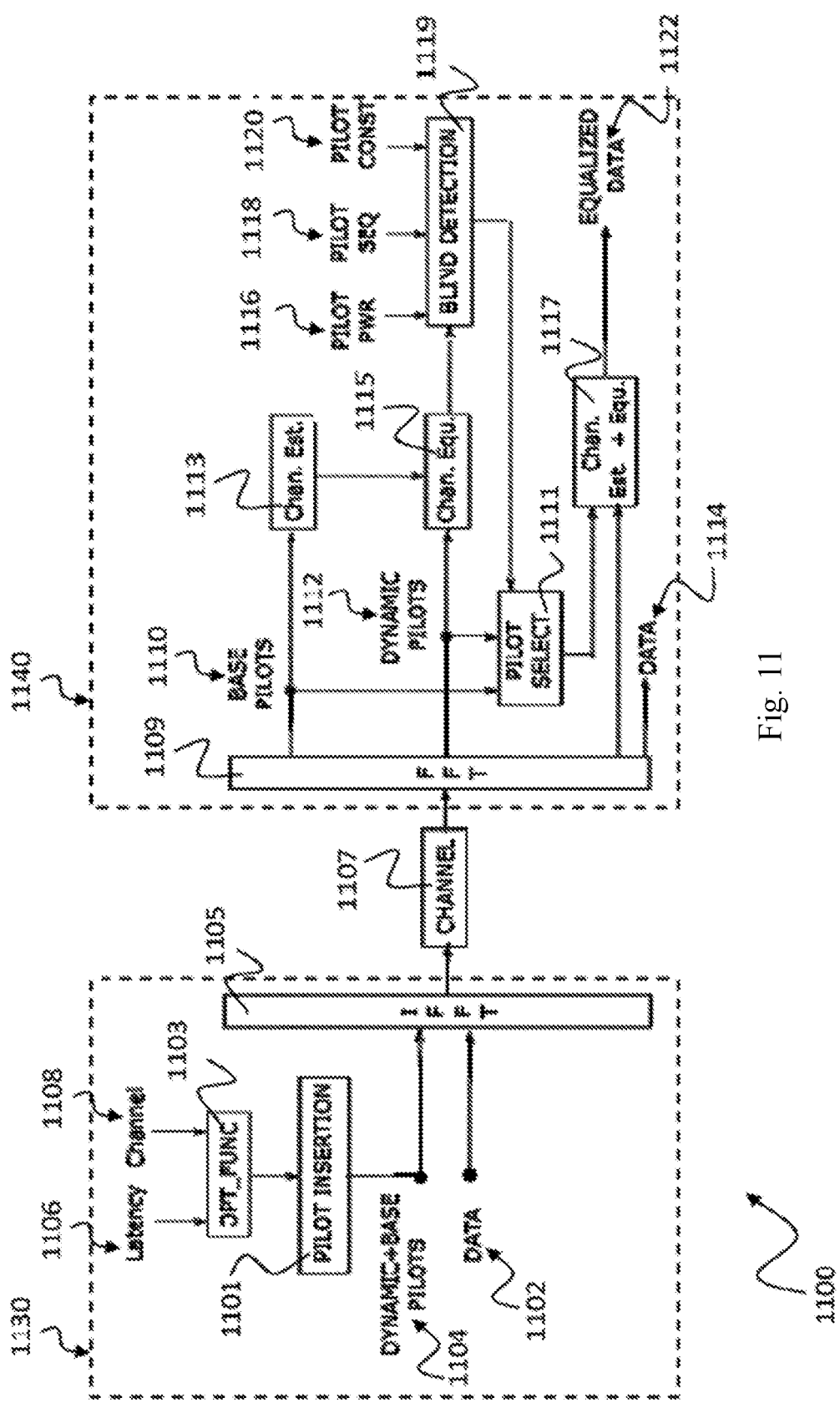
FIG. 11 shows a block diagram illustrating a radio communication system 1100 including a transmission device and a reception device according to an implementation form.

FIG. 11 shows a block diagram illustrating a radio communication system 1100 including a transmission device and a reception device according to an implementation form.

FIG. 11 summarizes the whole concept in a single block diagram. The following abbreviations are used: OPT_FUNC 1103: The optimization function which chooses the optimal pilot spacing; Chan. Est. 1113, 1117: Channel estimation (e.g. based on least squares or Wiener filter); Chan. Equ. 1115, 1117: Channel equalization based on estimated channel; PILOT PWR/SEQ/CONST 1116, 1118, 1120: Pilot power, sequence, and constellation.

The radio communication system 1100 includes a transmission device 1130, e.g. an implementation of the transmission device 200 described above with respect to FIG. 2, and a reception device 1140, e.g. an implementation of the reception device 300 described above with respect to FIG. 3. The transmission device 1130 transmits a radio signal over a channel 1107. The reception device 1140 receives the radio signal transmitted by the transmission device 1130 over the channel 1107.

At the transmission device 1130 a latency requirement 1106 and a channel property 1108, e.g. CSI is evaluated by an optimization function 1103. A result of the optimization function 1103 triggers a pilot insertion entity 1101 to insert dynamic and base pilots 1104 into a stream of data symbols 1102, e.g. as described above with respect to FIGS. 2 and 4 to 10. An IFFT unit 1105 generates the radio signal based on the composed pilot signal including the dynamic and base pilots 1104 and the data symbols 1102.

At the reception device 1140 an FFT unit 1109 transforms the received radio signal into a section of base pilots 1110, dynamic pilots 1112 and data symbols 1114. A channel estimator 1113 estimates the channel 1107 based on the base pilots 1110 and adjusts a channel equalizer 1115 to equalize the estimated channel 1107 using the dynamic pilots 1112. The result of channel equalization 1115 is input to a blind detection unit 1119 which blindly detects the received pilot pattern based on a known pilot power 1116, a known pilot sequence 1118 and a known pilot constellation 1120 as described above with respect to FIGS. 6 to 10. The pilot pattern detected by the blind detection unit 1119 controls a pilot selection unit 1111 to select a pilot pattern that may be used by a channel estimation and equalization unit 1117 for equalizing data 1122 based on the received data 1114. The pilot pattern may be selected including only the base pilots 1110 or including the base pilots 1110 and additionally the dynamic pilots 1112 depending on the result of the blind detection unit 1119.

Figure 12:
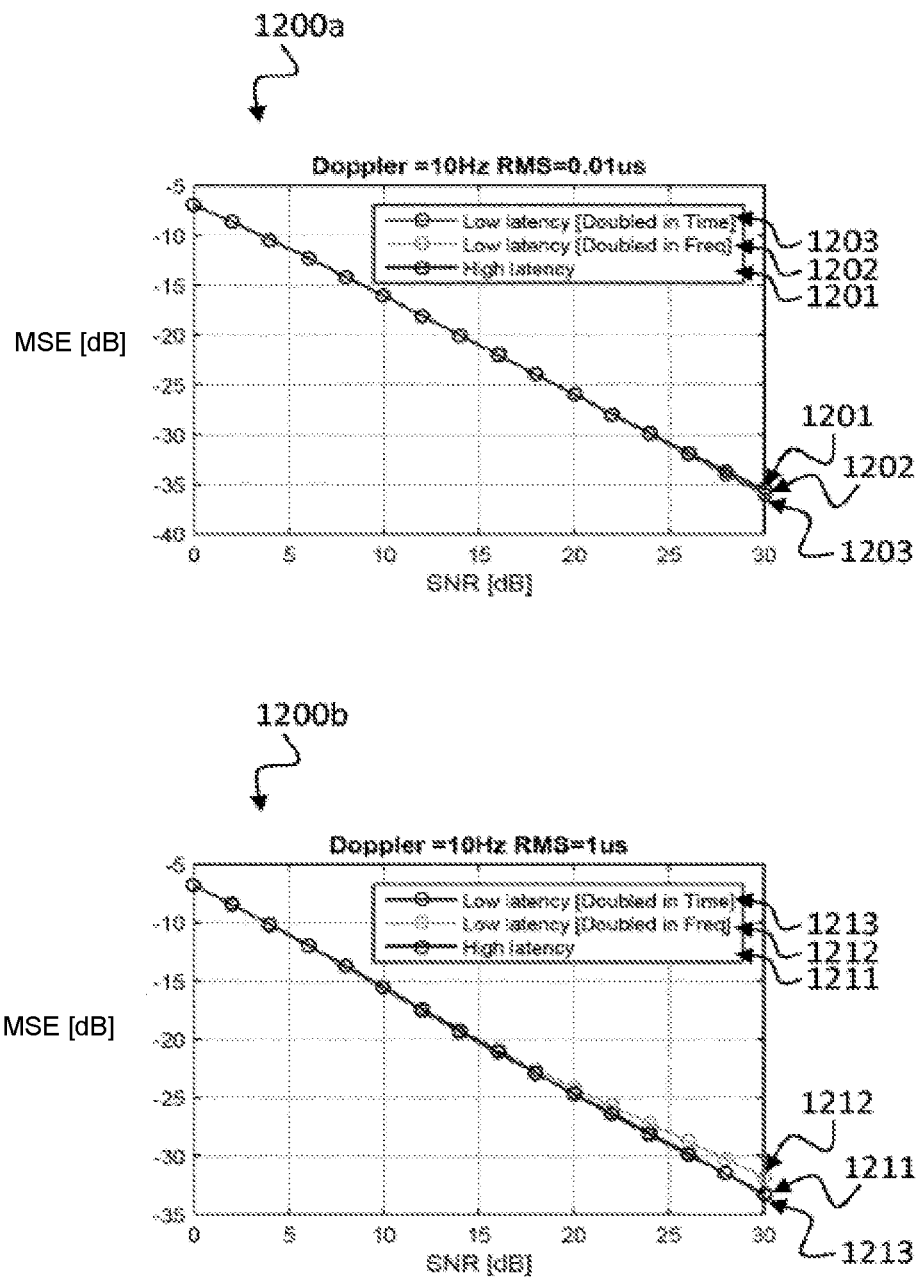
FIG. 12 shows two exemplary performance diagrams 1200a, 1200b illustrating mean square error over SNR for channel estimation with Doppler of 10 Hz.
Figure 13:
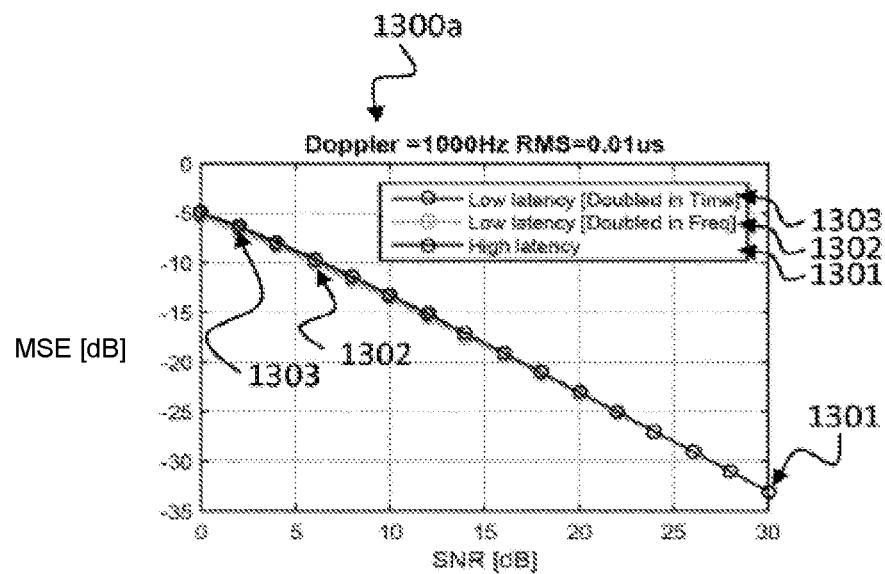
FIG. 13 shows two exemplary performance diagrams 1300a, 1300b illustrating mean square error over SNR for channel estimation with Doppler of 1000 Hz.
Figure 13:
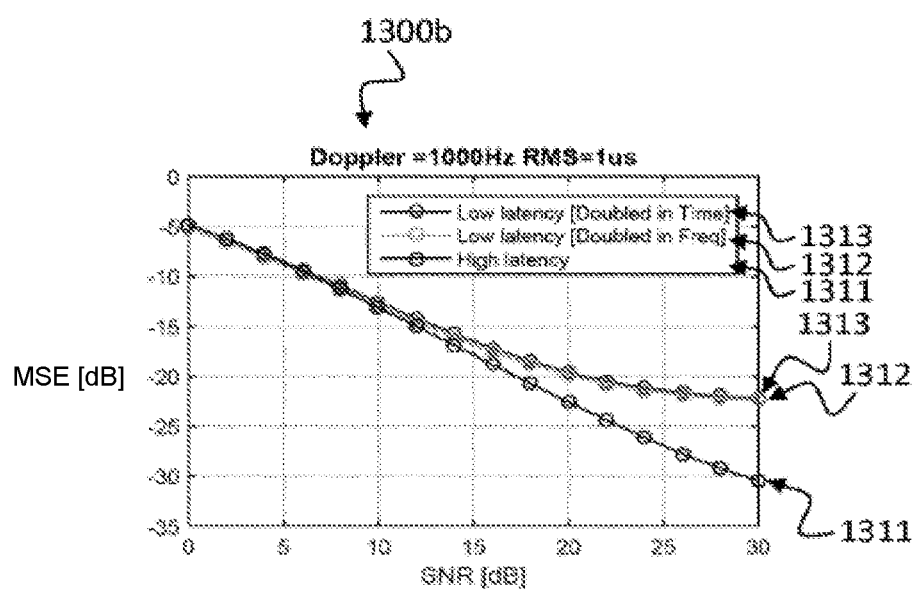

FIG. 12 shows two exemplary performance diagrams 1200a, 1200b illustrating mean square error over SNR for channel estimation with Doppler of 10 Hz and FIG. 13 shows two exemplary performance diagrams 1300a, 1300b illustrating mean square error over SNR for channel estimation with Doppler of 1000 Hz.

The concept of incremental pilot allocation was tested by comparing the theoretical Mean Squared Error (MSE) of channel estimation for 3 cases: a) High Latency case (1201, 1211, 1301, 1311), which is the LTE frame structure where the channel estimation window takes future pilots to estimate the channel. b) Low latency (1203, 1213, 1303, 1313) with doubled pilots in the time axis. In this case the channel estimation window takes only current and past values. The pilot density is doubled in time axis compared to LTE (new dynamic pilots). c) Low latency (1202, 1212, 1302, 1312) with doubled pilots in frequency axis and similar channel estimation window to b). The MSE is simulated for 4 different channels. Doppler=10 Hz (FIG. 12) or 1000 Hz (FIG. 13) and RMS delay=0.01 μs (upper parts 1200a, 1300a of FIG. 12, 13) or 1 μs (lower parts 1200b, 1300b of FIG. 12, 13).

As shown, the dynamic pilots manage to keep the MSE close for 3 cases, while for high Doppler high RMS case a deviation happens at high SNR. This implies that the disclosed dynamic pilots can maintain reliability constant at low latency frame structures.

Figure 14:
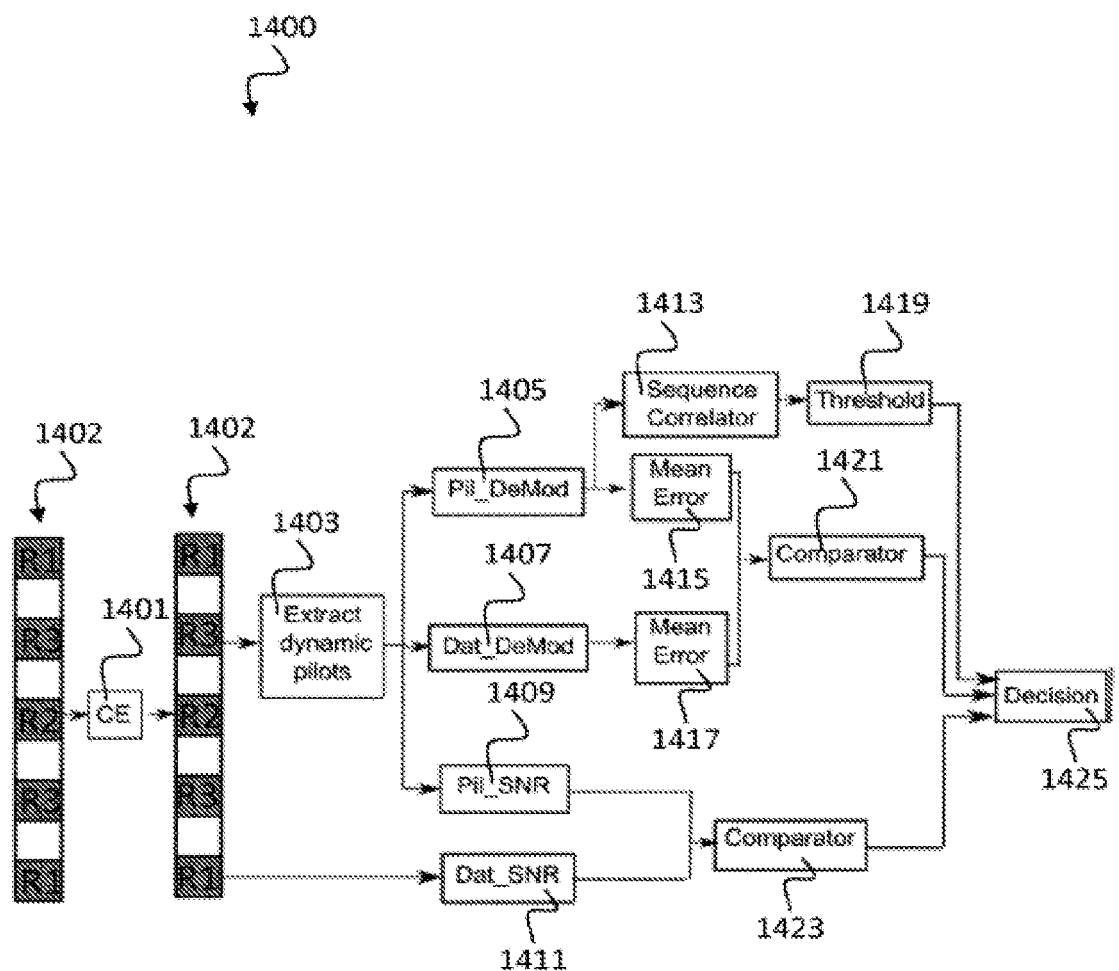
FIG. 14 shows a block diagram illustrating a reception device 1400 according to an implementation form.

FIG. 14 shows a block diagram illustrating a reception device 1400 according to an implementation form. The reception device 1400 is an exemplary implementation of the reception device 300 described above with respect to FIG. 3.

The reception device 1400 includes a channel estimator 1401 for estimating a channel based on a received radio signal 1402 having a specific pilot pattern, e.g. a pilot pattern including the base pilots R1 or a pilot pattern including base R1 and dynamic R2, R3 pilots. The reception device 1400 includes a dynamic pilot extraction unit 1403 for extracting dynamic pilots, e.g. R2, R3 from the received radio signal 1402.

A pilot demodulation unit 1405 demodulates the extracted dynamic pilots, a data demodulation unit 1407 demodulates data symbols, a pilot SNR unit 1409 determines signal-to-noise ratio (SNR) of the dynamic pilots and a data SNR unit 1411 determines SNR of the data symbols.

The result of the pilot demodulation unit 1405 is passed to a sequence correlator 1413 and a threshold 1419 to detect if the demodulated dynamic pilots are present in the received radio signal based on the criteria of known pilot correlation sequence as described above.

The results of the pilot demodulation unit 1405 and the data demodulation unit 1407 are passed to respective mean error estimation units 1415, 1417 and a comparator 1421 to detect if the demodulated dynamic pilots are present in the received radio signal based on the criteria of different constellation points of pilots and data symbols as described above.

The results of the pilot SNR unit 1409 and the data SNR unit 1411 are passed to a comparator 1423 to detect if the demodulated dynamic pilots are present in the received radio signal based on the criteria of different energy of pilots and data symbols as described above.

A decision unit 1425 decides if the demodulated dynamic pilots are present in the received radio signal based on evaluation the results of the threshold unit 1419 and the two comparators 1421, 1423.

The functionality of the reception device 1400 can be described as follows: As a first step, the receiver uses the base pilots to roughly estimate the channel at the candidate dynamic pilot locations and data locations. In FIG. 14, all 3 methods are presented to blindly detect the pilot sequence. Each candidate pilot element is demodulated and correlated to a pseudo random pilot sequence to detect the possible random sequence. Alternatively, the pilot elements can be demodulated according to the pilot constellation points and according to the data constellation points, e.g. by comparing the mean demodulation errors of the pilot constellation and the data constellation. Alternatively, the SNR at the possible pilot locations can be compared to the SNR at the data locations.

In the following an exemplary implementation is described: Pilots are grouped into base pilots, which are fixed from one TTI to the next, and dynamic pilots whose existence depends on a constrained latency and for a given achievable reliability, where at least the positions of a portion of the pilots (called the dynamic pilots) can be used for transmitting user data (e.g. for low latency transmission). The pilots are allocated in an incremental/decremental way, meaning that the set of the pilot positions in a resource block in a TTI is a subset or superset of the pilot positions of the same resource block in another TTI. The dynamic pilots have unique constellation points. For example, the pilot constellation points are phase shifted compared to the data constellation points. The pilot constellations/patterns are either signaled via a control channel, or detected blindly at the receiver. Blind detection can be based on correlation with the pilot pseudo-random sequence, and/or average demodulation error for pilot and data constellation, and/or average SNR. The dynamic pilot symbols may have higher signal power than data symbols in the case power limitation is not critical, such as in the case of V2V or eNB. The pilots may be a pseudo-random sequence. This facilitates a blind detection at the receiver.

The present disclosure also supports a method for transmitting a radio signal over a radio channel. The method includes: generating a radio signal in time-frequency domain; receiving CSI of the radio channel; composing a pilot signal from at least one pre-defined pilot signal, wherein a number and a location of the at least one pre-defined pilot signal in the composed pilot signal is determined based on at least one of a latency requirement and/or the received CSI; inserting the composed pilot signal into the radio signal; and transmitting the radio signal comprising the inserted composed pilot signal.

The present disclosure also supports a method for receiving a radio signal over a radio channel, the method comprising: receiving a radio signal comprising a composed pilot signal which comprises a pre-defined base pilot pattern and an optional set of pre-defined dynamic pilot patterns; detecting if the optional set of dynamic pilot patterns is present in the composed pilot signal; and estimating the radio channel based on the base pilot pattern if no optional set is detected by the detector, or based on both, the base pilot pattern and dynamic pilot patterns from the optional set if the optional set is detected.

The present disclosure also supports a computer program product including computer executable code or computer executable instructions that, when executed, causes at least one computer to execute the performing and computing steps described herein, in particular the steps of the methods described above. Such a computer program product may include a readable non-transitory storage medium storing program code thereon for use by a computer. The program code may perform the performing and computing steps described herein, in particular the methods described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the application beyond those described herein. While the present application has been described with reference to one or more particular embodiments, those skilled in the art recognize that many changes may be made thereto without departing from the scope of the present application. It is therefore to be understood that within the scope of the appended claims and their equivalents, the application may be practiced otherwise than as specifically described herein.

What is claimed is:

1. A transmission device, comprising:
a channel state information (CSI) interface configured to receive CSI of a radio channel; and
a processor configured to:
generate a radio signal in a time-frequency domain;
generate a composed pilot signal from at least one pre-defined pilot signal comprising a pre-defined base pilot pattern and/or an optional set of pre-defined dynamic pilot patterns, wherein a number and a location of the at least one pre-defined pilot signal in the composed pilot signal is determined based on a latency requirement of the radio channel and the CSI of the radio channel, wherein the processor is configured to generate the composed pilot signal for a given transmission time interval (TTI) based on a given base pilot pattern from a set of base pilot patterns, wherein each base pilot pattern in the set of base pilot patterns corresponds to a combination of a latency requirement and a CSI;
insert the composed pilot signal into the radio signal on a TTI basis; and
cause the transmission device to transmit the radio signal comprising the composed pilot signal.

2. The transmission device of claim 1, further comprising:
a storage device having predetermined values indicating a dependency of the number and the location of the at least one pre-defined pilot signal in the composed pilot signal based on the latency requirement and the CSI of the radio channel.

3. The transmission device of claim 1, wherein the latency requirement comprises at least one of:
a transmission delay requirement, and
a propagation delay of the radio channel, wherein the propagation delay is in terms of timing advance.

4. The transmission device of claim 3, wherein the composed pilot signal inserted for a TTI is a subset or a superset of the composed pilot signal inserted for another TTI.

5. The transmission device of claim 1,
wherein the CSI indicates an estimate of at least one of a coherence bandwidth, a coherence time, a signal energy, and a signal-to-noise ratio of the radio channel.

6. The transmission device of claim 1,
wherein the composed pilot signal for a current TTI is determined based on the CSI received for a previous TTI.

7. The transmission device of claim 1,
wherein each pre-defined dynamic pilot pattern in the optional set of pre-defined dynamic pilot patterns has pilot positions different from each other and different from the pre-defined base pilot pattern.

8. The transmission device of claim 7,
wherein the processor is configured to select the optional set of pre-defined dynamic pilot patterns in order to minimize a channel estimation error indicated by the CSI for the latency requirement.

9. The transmission device of claim 8,
wherein pilot positions of dynamic pilot patterns not selected by the processor carry user data.

10. The transmission device of claim 7,
wherein the processor is configured to signal the pre-defined dynamic pilot patterns selected by the processor to a reception device.

11. The transmission device of claim 7, wherein pilots of the optional set of pre-defined dynamic pilot patterns have at least one of the following properties:
a higher signal power than data symbols,
a constellation that is phase-shifted with respect to a constellation of the data symbols, and
a predefined pseudo-random sequence.

12. A reception device, comprising:
a receiver configured to receive a radio signal comprising a composed pilot signal, which is composed from at least one pre-defined pilot signal comprising a pre-defined base pilot pattern and/or an optional set of pre-defined dynamic pilot patterns, wherein a number and a location of the at least one pre-defined pilot signal in the composed pilot signal is determined based on a latency requirement of the radio channel and channel state information (CSI) of the radio channel, wherein the composed pilot signal is generated for a given transmission time interval (TTI) based on a given base pilot pattern from a set of base pilot patterns, wherein each base pilot pattern in the set of base pilot patterns corresponds to a combination of a latency requirement and a CSI; and
a processor configured to:
detect whether the optional set of pre-defined dynamic pilot patterns is present in the composed pilot signal; and
estimate a radio channel for receiving the radio signal based on the pre-defined base pilot pattern if the optional set of dynamic pilot patterns is not detected by the processor, or based on both the pre-defined base pilot pattern and dynamic pilot patterns from the optional set of pre-defined dynamic pilot patterns if the optional set of pre-defined dynamic pilot patterns is detected by the processor.

13. The reception device of claim 12,
wherein the processor is configured to detect the optional set of pre-defined dynamic pilot patterns based on blind detection or based on a signaling message.

14. The reception device of claim 12, wherein the optional set of pre-defined dynamic pilot patterns is detected by the processor, and the processor is further configured to:
select dynamic pilot patterns of the optional set of pre-defined dynamic pilot patterns to be used by the processor to estimate the radio channel.

15. The reception device of claim 12, wherein the processor is configured to detect the optional set of pre-defined dynamic pilot patterns based on at least one of the following detection criteria:
pilots of the optional set of pre-defined dynamic pilot patterns that have a higher signal power than data symbols,
a constellation of the pilots of the optional set of pre-defined dynamic pilot patterns that is different than a constellation of the data symbols, and
the pilots of the optional set of pre-defined dynamic pilot patterns that have a predefined pseudo-random sequence.

16. A non-transitory computer readable medium comprising instructions that, when executed, cause one or more processors to execute a method for transmitting a radio signal over a radio channel, the method comprising:
generating, by a transmission device, a radio signal a time-frequency domain;
receiving, by the transmission device, a channel state information (CSI) of the radio channel;
generating, by the transmission device, a composed pilot signal from at least one pre-defined pilot signal comprising a pre-defined base pilot pattern and/or an optional set of pre-defined dynamic pilot patterns, wherein a number and a location of the at least one pre-defined pilot signal in the composed pilot signal is determined based on a latency requirement of the radio channel and the CSI of the radio channel, wherein the transmission device is configured to generate the composed pilot signal for a given transmission time interval (TTI) based on a given base pilot pattern from a set of base pilot patterns, wherein each base pilot pattern in the set of base pilot patterns corresponds to a combination of a latency requirement and a CSI;
inserting, by the transmission device, the composed pilot signal into the radio signal on a TTI basis; and
transmitting, by the transmission device, the radio signal comprising the composed pilot signal.

17. A non-transitory computer readable medium comprising instructions that, when executed, cause one or more processors to execute a method for receiving a radio signal over a radio channel, the method comprising:
receiving, by a reception device, a radio signal comprising a composed pilot which is composed from at least one pre-defined pilot signal comprising a pre-defined base pilot pattern and/or an optional set of pre-defined dynamic pilot patterns, wherein a number and a location of the at least one pre-defined pilot signal in the composed pilot signal is determined based on a latency requirement of the radio channel and channel state information (CSI) of the radio channel, wherein the composed pilot signal is generated for a given transmission time interval (TTI) based on a given base pilot pattern from a set of base pilot patterns, wherein each base pilot pattern in the set of base pilot patterns corresponds to a combination of a latency requirement and a CSI;
detecting, by the reception device, whether the optional set of pre-defined dynamic pilot patterns is present in the composed pilot signal; and
estimating, by the reception device, the radio channel for receiving the radio signal based on the pre-defined base pilot pattern if the optional set of dynamic pilot patterns is not detected, or based on both the pre-defined base pilot pattern and dynamic pilot patterns from the optional set of pre-defined dynamic pilot patterns if the optional set is detected.

* * * * *